United States Patent Office 3,728,263

Patented Apr. 17, 1973

3,728,263

PIEZOELECTRIC CERAMIC COMPOSITIONS

Masamitsu Nishida, Osaka, and Hirumu Ouchi, Toyonaka, Japan, assignors to Matsushita Electric Industrial Co., Ltd., Osaka, Japan No Drawing. Filed May 5, 1971, Ser. No. 140,565
Claims priority, application Japan, May 19, 1970, 45/43,183; May 25, 1970, 45/45,322
Int. Cl. C04b *35/46, 35/48*
U.S. Cl. 252—62.9 14 Claims

ABSTRACT OF THE DISCLOSURE

Piezoelectric ceramic compositions having very high mechanical quality factors, high electromechanical coupling coefficients and highly stable dielectric constants over a wide temperature range, and comprising the ternary system $Pb(Zn_{1/2}Nb_{2/3})O_3$-$PbTiO_3$-$PbZrO_3$ and containing 0.1 to 5 weight percent of $MnO_2$, and further containing at least one oxide selected from the group consisting of 0.03 to 2.5 weight percent aluminum oxide and 0.05 to 5 weight percent stannic oxide.

BACKGROUND OF THE INVENTION

This invention relates to piezoelectric ceramic compositions and articles of manufacture fabricated therefrom. More particularly, the present invention pertains to novel ferroelectric ceramics which are polycrystalline aggregates of certain constituents. These piezoelectric compositions are sintered into ceramics by ordinary ceramic techniques and thereafter the ceramics are polarized by applying a D.C. voltage between electrodes to impart thereto electromechanical transducing properties similar to the well known piezoelectric effect. The invention also encompasses the calcined intermediate product of raw ingredients and the articles of manufacture such as electromechanical transducers fabricated from the sintered ceramic.

The use of piezoelectric materials in various transducer applications in the production, measurement and sensing of sound, shock, vibration, pressure, and high voltage generation etc. have increased greatly in recent years. Both crystal and ceramic types of transducers have been widely used. But, because of their potentially lower cost and ease of use in the fabrication of ceramics of various shapes and sizes and their greater durability at high temperatures and/or high humidities than crystalline substances such as Rochelle salt, etc., piezoelectric ceramic materials have recently come into prominent use in various transducer applications.

The piezoelectric characteristics required of ceramics apparently vary depending upon the intended application. For example, electromechanical transducers such as phonograph pickup and microphone elements require piezoelectric ceramics characterized by a substantially high electromechanical coupling coefficient and dielectric constant. On the other hand, in the ceramic filter and piezoelectric transformer applications of piezoelectric ceramics it is desirable that the materials exhibit a higher value of mechanical quality factor and a high electromechanical coupling coefficient. Furthermore, ceramic materials require a high stability in dielectric constant and in other electrical properties over wide temperature and time ranges. Also, electromechanical transducers such as a ceramic ignitor element applied as a spark source for gas require piezoelectric ceramics characterized by high piezoelectricity, high mechanical strength and great durability of output voltage with cycling of mechanical stress.

As a promising ceramic for these applications, lead titanate-lead zirconate has been in wide use up to now. However, it is difficult to obtain a very high mechanical quality factor along with a high planar coupling coefficient in the conventional lead titanate-lead zirconate ceramics. Moreover, the dielectric and piezoelectric properties of the lead titanate-lead zirconate ceramics vary greatly depending upon the firing technique employed due to the evaporation of PbO. Improvement of these factors has been made by incorporating various additional constituents into the basic ceramic composition or by incorporating various complex compounds. For example, U.S. Pat. 2,911,370 relates to lead titanate zirconate ceramics modified with $Nb_2O_5$, $Ta_2O_5$ and $Y_2O_3$ etc., and U.S. Pat. 3,403,103 relates to ternary system $$PbZn_{1/3}Nb_{2/3}O_3\text{-}PbTiO_3\text{-}PbZrO_3$$

ceramics. These ceramics exhibit high electromechanical coupling coefficients but exhibit low mechanical quality factors.

OBJECTS AND SUMMARY OF THE INVENTION

It is, therefore, the fundamental object of the present invention to provide novel and improved piezoelectric ceramic materials which overcome the problems outlined above. A specific object of the invention is to provide improved polycrystalline ceramics characterized by very high mechanical quality factors along with high piezoelectric coupling coefficients.

A more specific object of the invention is the provision of novel piezoelectric ceramics characterized by very high mechanical quality factors, high electromechanical coupling coefficients, and highly stable dielectric constants over wide temperature and time ranges.

Another object of the invention is the provision of novel piezoelectric ceramics characterized by great durability of output voltage with cycling of mechanical impact on a ceramic ignitor element applied as a spark source for gas.

Still another object of the invention is the provision of novel piezoelectric ceramics characterized by high mechanical strength.

A further object of the invention is the provision of novel piezoelectric ceramic compositions, certain properties of which can be varied to suit various applications.

A still further object of the invention is the provision of improved electromechanical transducers utilizing, as the active elements, electrostatically polarized bodies composed of these novel ceramic compositions.

These objects are achieved by providing ceramic bodies which exist basically in the solid solution comprising the ternary system $Pb(Zn_{1/3}Nb_{2/3})O_3$-$PbTiO_3$-$PbZrO_3$ modified with a first additive of $MnO_2$ and a second additive of $Al_2O_3$ or $SnO_2$.

DETAILED DESCRIPTION OF THE INVENTION

The present invention is based on the discovery that within certain particular compositional ranges of this system the specimens modified with a first additive of $MnO_2$ and a second additive of $Al_2O_3$ or $SnO_2$ exhibit very high mechanical quality factors and high electromechanical coupling coefficients along with highly stable dielectric constants over wide temperature and time ranges.

The ceramic compositions of the present invention have various advantages in the processes for their manufacture and in their application for ceramic transducers. It has been known that the evaporation of PbO during firing is a problem encountered in the sintering of lead compounds such as lead titanate-zirconate. The compositions of the invention evidence a smaller amount of evaporated PbO than the usual lead titanate-zirconates upon firing. The ternary system can be fired in the absence of a PbO atmosphere. A well sintered body according to the present composition is obtained by firing the above described compositions in a ceramic crucible covered with a ceramic cover made of $Al_2O_3$ ceramics. A high sintered density is desirable for resistance to humidity and high piezoelectric response when the sintered body is utilized as a resonator and for other applications.

All possible compositions coming within the ternary system $Pb(Zn_{1/3}Nb_{2/3})O_3$-$PbTiO_3$-$PbZrO_3$ being the basic composition of the present invention are represented by the triangular diagram having the corner members of $Pb(Zn_{1/3}Nb_{2/3})O_3$, $PbTiO_3$ and $PbZr_3$. Some compositions represented by the diagram, however, do not exhibit high piezoelectricity, and many are electromechanically active only to a slight degree. The present invention is concerned only with those basic compositions exhibiting piezoelectric response of appreciable magnitude. As a matter of convenience, the planar coupling coefficient ($K_p$) of test discs will be taken as a measure of piezoelectric activity. Thus, all compositions polarized and tested which were represented by the formula $Pb(Zn_{1/3}Nb_{2/3})_xTi_yZr_zO_3$, wherein $x$, $y$ and $z$ respectively had the following molar ratio 0.01–0.50, 0.125–0.75 and 0.125–0.865, and $x+y+z=1$, exhibited a planar coupling coefficient of approximately 0.1 or higher. The basic compositions which were represented by the formula $$Pb(Zn_{1/3}Nb_{2/3})_xTi_yZr_zO_3,$$

wherein $x$, $y$ and $z$ respectively had the following molar ratio, 0.01–0.375, 0.25–0.625 and 0.25–0.625, and $x+y+z=1$, exhibited a planar coupling coefficient of approximately 0.3 or higher. The compositions of the present invention comprise these basic compositions and additives of $MnO_2$, and $Al_2O_3$ or $SnO_2$.

The compositions described herein may be prepared in accordance with various well-known ceramic procedures. A preferred method, however, hereinafter more fully described, contemplates the use of PbO or $Pb_3O_4$, ZnO, $Nb_2O_5$, $TiO_2$, $ZrO_2$, $MnO_2$ and $Al_2O_3$ or $SnO_2$ as starting materials.

Example 1

The starting materials, vis, lead oxide (PbO), zinc oxide (ZnO), niobia ($Nb_2O_5$), titania ($TiO_2$), zirconia ($ZrO_2$), manganese dioxide ($MnO_2$) and aluminum oxide ($Al_2O_3$) or stannic oxide ($SnO_2$), all of relatively pure grade (e.g. C.P. grade) are intimately mixed in a rubber-lined ball mill with distilled water. In milling the mixture care should be exercised to avoid contamination thereof due to wear of the milling ball or stones. This may be avoided by varying the proportions of the starting materials to compensate for any contamination.

Following the wet milling, the mixture is dried and mixed to insure as homogeneous a mixture as possible. Thereafter, the mixture is suitably formed into desired forms at a pressure of 400 kg./cm.². The compacts are then pre-reacted by a calcination at a temperature of about 850° C. for about 2 hours.

After calcination, the reacted material is allowed to cool and is then wet milled to a small particle size. $MnO_2$ and $Al_2O_3$ or $SnO_2$ additives may be added to the reacted material after calcination of raw materials which did not include $MnO_2$ and $Al_2O_3$ or $SnO_2$, and then the reacted material with $MnO_2$ and $Al_2O_3$ or $SnO_2$ additive is milled to a small particle size. Once again, care should be exercised as above to avoid contamination by wear of the milling balls or stones. Depending on preference and the shapes desired, the material may be formed into a mix or slip suitable for pressing, slip casting, or extruding, as the case may be, in accordance with conventional ceramic forming procedures. The samples for which data are given hereinbelow were prepared by mixing 100 grams of the milled pre-sintered mixture with 5 cc. of distilled water. The mix was then pressed into discs of 20 mm. diameter and 2 mm. thickness at a pressure of 700 kg./cm.². The pressed discs were fired at 1150–1300° C. for 45 minutes. According to the present invention, there is no need to fire the composition in an atmosphere of PbO. Moreover, there is no need to maintain a special temperature gradient in the firing furnace as is necessary in prior art procedures. Thus, according to the present invention, uniform and excellent piezoelectric ceramic products can be easily obtained simply by covering the samples with an alumina crucible during firing.

The sintered ceramics were polished on both surfaces to a thickness of 1 millimeter. The polished disc surfaces were then coated with silver paint and fired to form silver electrodes. Finally, the discs were polarized while immersed in a bath of silicone oil at 100–150° C. A voltage gradient of D.C. 3–4 kg. per mm. was maintained for one hour, and the disc field-cooled to room temperature in thirty minutes.

The piezoelectric and dielectric properties of the polarized specimen were measured at 20° C. in a relative humidity of 50% and at a frequency of 1 kc. Examples of specific ceramic compositions according to this invention and various pertinent electromechanical and dielectric properties thereof are given in Tables I and II. From Table I it will be readily evident that all exemplary compositions modified with the additives $MnO_2$ and $Al_2O_3$ or

TABLE I

| | Compositions | | | | 24 hours after poling | | |
|---|---|---|---|---|---|---|---|
| | | Additives in, weight percent | | | | | |
| Example No. | Basic compositions | $MnO_2$ | $Al_2O_3$ | $SnO_2$ | Dielectric constant $\epsilon$ | Planar coupling coefficient $K_p$ | Mechanical quality factor $Q_M$ |
| 1 | $Pb(Zn_{1/3}Nb_{2/3})_{0.06}Ti_{0.46}Zr_{0.48}O_3$ | 0.1 | | | 1,120 | 0.57 | 680 |
| 2 | Same as above | 0.1 | 0.5 | | 1,010 | 0.59 | 1,320 |
| 3 | do | 0.5 | | | 940 | 0.55 | 950 |
| 4 | do | 0.5 | 0.1 | | 950 | 0.59 | 2,090 |
| 5 | do | 0.5 | 0.5 | | 900 | 0.60 | 2,420 |
| 6 | do | 0.5 | 1.0 | | 880 | 0.57 | 2,430 |
| 7 | do | 0.5 | 2.5 | | 790 | 0.56 | 2,040 |
| 8 | do | 1.0 | 0.5 | | 880 | 0.58 | 2,120 |
| 9 | do | 0.1 | | 0.5 | 950 | 0.58 | 1,470 |
| 10 | do | 0.5 | | 0.1 | 970 | 0.58 | 2,150 |
| 11 | do | 0.5 | | 0.5 | 920 | 0.61 | 2,520 |
| 12 | do | 0.5 | | 1.0 | 870 | 0.58 | 2,470 |
| 13 | do | 0.5 | | 5.0 | 800 | 0.56 | 2,130 |
| 14 | do | 1.0 | | 0.5 | 930 | 0.58 | 2,210 |
| 15 | $Pb(Zn_{1/3}Nb_{2/3})_{0.15}Ti_{0.42}Zr_{0.43}O_3$ | 0.5 | | | 1,370 | 0.59 | 1,420 |
| 16 | Same as above | 0.5 | 0.03 | | 1,370 | 0.62 | 1,850 |
| 17 | do | 0.5 | 0.1 | | 1,310 | 0.64 | 2,190 |
| 18 | do | 0.5 | 0.5 | | 1,250 | 0.63 | 2,790 |
| 19 | do | 0.5 | 1.0 | | 950 | 0.57 | 2,870 |
| 20 | do | 1.0 | 0.5 | | 1,110 | 0.60 | 2,150 |
| 21 | do | 5.0 | | | 870 | 0.48 | 1,020 |
| 22 | do | 5.0 | 1.0 | | 900 | 0.54 | 1,750 |
| 23 | do | 0.5 | | 0.05 | 1,340 | 0.61 | 1,920 |
| 24 | do | 0.5 | | 0.1 | 1,320 | 0.63 | 2,230 |
| 25 | do | 0.5 | | 0.5 | 1,310 | 0.64 | 2,810 |
| 26 | do | 0.5 | | 1.0 | 1,140 | 0.60 | 2,940 |
| 27 | do | 1.0 | | 0.5 | 980 | 0.60 | 2,320 |
| 28 | do | 5.0 | | 1.0 | 930 | 0.53 | 1,890 |

$SnO_2$ are characterized by very high mechanical quality factors and high planar coupling coefficients, all of which properties are important for the use of piezoelectric compositions in ceramic filter, piezoelectric transformer and ultra-sonic transducer applications. From Tables I and II it will be obvious that the compositions modified with the first additive of $MnO_2$ and the second additive of $Al_2O_3$ or $SnO_2$ exhibit remarkably improved planar coupling coefficients, mechanical quality factors, mechanical strengths and changes of dielectric constant with temperature as compared with the compositions not containing $Al_2O_3$ or $SnO_2$.

From the foregoing Table I, it is apparent that the values of mechanical quality factors, planar coupling coefficients and dielectric constants can be varied to suit various applications by selecting the base composition and amounts of $MnO_2$ and $Al_2O_3$ or $SnO_2$.

From Table II, it will be evident that the piezoelectric ceramics of this invention exhibit highly stable dielectric constants over a temperature range of 20–70° C. and high mechanical strengths.

Example 2

The reacted powder preparated by the same method as Example 1 was pressed into columns 10 mm. in diameter and 20 mm. in length at a pressure of 700 kg./cm.[2]. The pressed columns were fired at 1150–1300° C. for 45 minutes. The sintered ceramics were polished to form columns 7 mm. in diameter and 15 mm. in length. Both sides of the polished columns were then coated with silver paint and fired to form silver electrodes. The columns were polarized while immersed in a bath of silicone oil at 100–150° C. A voltage gradient of D.C. 2–3 kv. per mm. was maintained for 30 minutes. Examples of specific ceramic compositions according to this invention and pertinent electromechanical properties are given in Table III. From Table III it will be evident that all exemplary compositions modified with the first additive of $MnO_2$ and the second additive of $Al_2O_3$ or $SnO_2$ are characterized by high durability of the piezoelectric constant with cycling of mechanical impact. Therefore, the ceramics of this invention exhibit great durability of output voltage with cycling of mechanical impact on a ceramic ignitor element applied as a spark source for gas.

TABLE III

| Example No. | Basic compositions | Compositions: Additives, in weight percent: $MnO_2$ | $Al_2O_3$ | $SnO_2$ | Piezoelectric constant $g_{33}\times10^3.V-M/N$: Before impact | After impact |
|---|---|---|---|---|---|---|
| 5 | $Pb(Zn_{1/3}Nb_{2/3})_{0.06}Ti_{0.46}Zr_{0.48}O_3$ | 0.5 | 0.5 | | 29.2 | 27.6 |
| 11 | Same as above | 0.5 | | 0.5 | 29.3 | 27.5 |
| 19 | $Pb(Zn_{1/3}Nb_{2/3})_{0.15}Ti_{0.42}Zr_{0.43}O_3$ | 0.5 | 1.0 | | 28.5 | 27.1 |
| 26 | Same as above | 0.5 | | 1.0 | 28.3 | 26.7 |

TABLE II

| Example No. | ε-T.C., percent | Kg./cm.[2] |
|---|---|---|
| 3 | 29.4 | 1,050 |
| 4 | 15.3 | 1,120 |
| 5 | 12.1 | 1,270 |
| 6 | 5.6 | 1,210 |
| 8 | 13.4 | 1,180 |
| 10 | 15.6 | 1,170 |
| 11 | 13.3 | 1,220 |
| 12 | 6.9 | 1,230 |
| 14 | 12.9 | 1,200 |
| 15 | 24.5 | 1,090 |
| 17 | 15.9 | 1,150 |
| 18 | 12.7 | 1,290 |
| 19 | 8.1 | 1,250 |
| 20 | 12.1 | 1,200 |
| 24 | 14.7 | 1,170 |
| 25 | 11.9 | 1,270 |
| 26 | 7.1 | 1,240 |
| 27 | 11.8 | 1,190 |

ε-T.C. is the change in dielectric constant within the range of 20–70° C.

These properties are important to the use of piezoelectric compositions in piezoelectric transformer and filter applications, etc. The term piezoelectric transformer is here employed to describe a passive electrical energy transfer device or transducer employing the piezoelectric properties of the material of which they are constructed to achieve a transformation of voltage, current or impedance. It is desirable in this application of the ceramics that the piezoelectric materials exhibit a highly stable dielectric constant over a wide temperature range and exhibit very high mechanical quality factors and high electromechanical coupling coefficients in order that the piezoelectric transformer utilized in a T.V. set etc. exhibits a high stability with temperature in output voltage and current. It is desirable in these applications of the ceramics that the piezoelectric ceramics exhibit a high mechanical strength in order that products employing the ceramics exhibit high reliability over wide time ranges and in high mechanical stress.

According to the present invention, the piezoelectric ceramics have high electromechanical coupling coefficients. Therefore, the ceramics of the invention are also suitable for use in electromechanical transducer elements such as phonograph pickups, microphones and voltage generators in ignition systems.

The piezoelectric constant after impact was measured after $10^7$ mechanical impacts at a pressure of 400 kg./cm.[2].

This property is important to the use of piezoelectric ceramics as ceramic ignitors, etc.

In ceramic compositions containing the additive $MnO_2$ in amounts more than 5% by weight, $Q_M$ and $K_p$ are relatively low. Ceramic compositions containing an amount of $MnO_2$ less than 0.1% by weight exhibit low $Q_M$. And the compositions containing more than 2.5% by weight of $Al_2O_3$ or more than 5% by weight of $SnO_2$ exhibit relatively low $K_p$. The ceramic compositions containing less than 0.03% by weight of $Al_2O_3$ or less than 0.05% by weight of $SnO_2$ exhibit relatively low $Q_M$. For these reasons compositions outside of these ranges are excluded from the scope of the present invention.

In addition to the superior properties shown above, compositions according to the present invention yield ceramics of good physical quality and which polarize well. It will be understood from the foregoing that the ternary solid solution $Pb(Zn_{1/3}Nb_{2/3})O_3$-$PbTiO_3$-$PbZrO_3$ modified with the specified amounts of $MnO_2$ and $Al_2O_3$ or $SnO_2$ as additives form excellent piezoelectric ceramic bodies.

It will be evident that the starting materials to be used in this invention are not limited to those used in the above examples. Those oxides may be used, in place of the starting materials of the above examples, which are easily decomposed at elevated temperatures to form the required compositions.

While there have been described what at present are believed to be the preferred embodiments of this invention, it will be obvious that various changes and modifications can be made therein without departing from the spirit or scope of the invention.

What is claimed is:

1. A piezoelectric ceramic composition consisting essentially of a solid solution of a material represented by the formula:

$$Pb(Zn_{1/3}Nb_{2/3})_xTi_yZr_zO_3$$

wherein the ranges for $x$, $y$ and $z$ are: $x=0.01–0.50$, $y=0.125–0.75$, $z=0.125–0.865$, and wherein $x+y+z=1$, and further containing 0.1 to 5 weight percent manganese dioxide and at least one oxide selected from the group consisting of aluminum oxide in an amount ranging from 0.03 to 2.5 weight percent and stannic oxide in an amount ranging from 0.05 to 5 weight percent.

2. A process for the preparation of the ceramic composition of claim 1 comprising intimately wet-mixing a lead oxide, a zinc oxide, $Nb_2O_5$, $TiO_2$, $ZrO_2$, $MnO_2$ and $Al_2O_3$ or $SnO_2$; drying said mixture; pressing said mixture into a predetermined shape; pre-reacting said mixture by calcining at about 850° C. for about 2 hours; cooling said calcined mixture; reducing said mixture to a smaller particle size; shaping said particulate mixture; and firing said shaped mixture at 1150–1300° C. for 45 minutes.

3. A piezoelectric ceramic composition consisting essentially of a solid solution of a material represented by the formula:

$$Pb(Zn_{1/3}Nb_{2/3})_xTi_yZr_zO_3$$

wherein the ranges for $x$, $y$ and $z$ are: $x$=0.01–0.375, $y$=0.25–0.625, $z$=0.25–0.625, wherein $x+y+z=1$, and further containing 0.1 to 5 weight percent manganese dioxide and 0.03 to 2.5 weight percent aluminum oxide.

4. An electromechanical transducer element comprising a ceramic composition as claimed in claim 2.

5. A piezoelectric ceramic composition consisting essentially of a solid solution of a material represented by the formula:

$$Pb(Zn_{1/3}Nb_{2/3})_xTi_yZr_zO_3$$

wherein the ranges for $x$, $y$ and $z$ are: $x$=0.01–0.375, $y$=0.25–0.625, $z$=0.25–0.625, wherein $x+y+z=1$, and further containing 0.1 to 5 weight percent manganese dioxide and 0.05 to 5 weight percent stannic oxide.

6. An electromechanical transducer element comprising a ceramic composition as claimed in claim 5.

7. A piezoelectric ceramic material consisting essentially of a solid solution represented by the formula:

$$Pb(Zn_{1/3}Nb_{2/3})_{0.06}Ti_{0.46}Zr_{0.48}O_3$$

and further containing 0.5 weight percent manganese dioxide and 0.5 weight percent aluminum oxide.

8. An electromechanical transducer element comprising a ceramic composition as claimed in claim 7.

9. A piezoelectric ceramic material consisting essentially of a solid solution represented by the formula $$Pb(Zn_{1/3}Nb_{2/3})_{0.06}Ti_{0.46}Zr_{0.48}O_3$$

and further containing 0.5 weight percent manganese dioxide and 0.5 weight percent stannic oxide.

10. An electromechanical transducer element comprising a ceramic composition as claimed in claim 9.

11. A piezoelectric ceramic consisting essentially of $$Pb(Zn_{1/3}Nb_{2/3})_{0.15}Ti_{0.42}Zr_{0.43}O_3$$

and further containing 0.5 weight percent manganese dioxide and 1.0 weight percent aluminum oxide.

12. An electromechanical transducer element comprising a ceramic composition as claimed in claim 11.

13. A piezoelectric ceramic consisting essentially of $$Pb(Zn_{1/3}Nb_{2/3})_{0.15}Ti_{0.42}Zr_{0.43}O_3$$

and further containing 0.5 weight percent manganese dioxide and 1.0 weight percent stannic oxide.

14. An electromechanical transducer element comprising a ceramic composition as claimed in claim 13.

References Cited

UNITED STATES PATENTS

| | | | |
|---|---|---|---|
| 3,546,120 | 12/1970 | Ouchi et al. | 252—62.9 |
| 3,425,944 | 2/1969 | Ouchi et al. | 252—62.9 |
| 3,464,924 | 9/1969 | Banno et al. | 252—62.9 |
| 3,481,875 | 12/1969 | Akashi et al. | 252—62.9 |

FOREIGN PATENTS

| | | | |
|---|---|---|---|
| 16,870 | 6/1970 | Japan | 252—62.9 |

OSCAR R. VERTIZ, Primary Examiner

J. COOPER, Assistant Examiner